United States Patent [19]

Bodewigs

[11] Patent Number: 5,340,963
[45] Date of Patent: Aug. 23, 1994

[54] ALTERNATING CURRENT POWER SOURCE FOR WELDING

[75] Inventor: Peter W. Bodewigs, Dusseldorf, Fed. Rep. of Germany

[73] Assignee: Miller Electric Mfg. Co., Appleton, Wis.

[21] Appl. No.: 938,253

[22] PCT Filed: Jan. 9, 1991

[86] PCT No.: PCT/DE91/00012
§ 371 Date: Oct. 13, 1992
§ 102(e) Date: Oct. 13, 1992

[87] PCT Pub. No.: WO91/12922
PCT Pub. Date: Sep. 5, 1991

[30] Foreign Application Priority Data

Feb. 15, 1990 [DE] Fed. Rep. of Germany ....... 4004667

[51] Int. Cl.$^5$ .................................................. B23K 9/10
[52] U.S. Cl. .................................. 219/130.1; 363/151
[58] Field of Search ...................... 219/130.1, 137 PS; 363/148, 151

[56] References Cited

U.S. PATENT DOCUMENTS

| | | | |
|---|---|---|---|
| 2,337,932 | 12/1943 | Rogers | 363/151 |
| 2,534,754 | 12/1950 | Boyer et al. | 363/151 |
| 3,959,712 | 5/1976 | Kelley, Jr. et al. | 363/151 |
| 4,435,632 | 3/1984 | Risberg | 219/137 PS |

FOREIGN PATENT DOCUMENTS

| | | | |
|---|---|---|---|
| 666250 | 11/1965 | Belgium . | |
| 2556980 | 6/1978 | Fed. Rep. of Germany | 219/130.1 |
| 2758033 | 6/1979 | Fed. Rep. of Germany . | |
| 3113671 | 10/1982 | Fed. Rep. of Germany . | |
| 2039166 | 7/1980 | United Kingdom | 219/130.1 |
| 2039168 | 7/1980 | United Kingdom | 219/130.1 |

*Primary Examiner*—Clifford C. Shaw
*Attorney, Agent, or Firm*—Foley & Lardner

[57] ABSTRACT

A AC power source for welding is configured to receive three phase power and to provide single phase current to a welding load. The power source includes a three phase transformer with three center tapped secondary windings, a center tapped output inductor, and suitably triggered thyristors between the secondaries and the output inductor.

8 Claims, 1 Drawing Sheet

ALTERNATING CURRENT POWER SOURCE FOR WELDING

BACKGROUND OF THE INVENTION

The invention concerns an alternating current power source for welding, in particular for TIG and electrode welding, for generating an alternating current from a three-phase current.

In the welding of metals, which form nonconducting and/or high-melting oxides, by the TIG process, it is necessary for the purpose of removing the oxide skin to operate either with reversed polarity (positive pole at the electrode), which is possible, however, only with low current intensities in view of the excessive generation of heat at the welding torch, or with an alternating current, which corresponds to the current practice.

In electrode welding with a direct current, blow effects are frequently encountered, which render the control of the arc impossible. Here, again, an alternating current must be used.

According to the prior art, welding transformers are used for this purpose, which are connected on the primary side to two phases of the three-phase supply network and wherein the welding current is regulated by means of scatter yoke cores, transductors or thyristors with phase-gating control.

Power sources of this type have the disadvantage of a high power requirement, which in the case of the welding currents usually required rapidly exceeds the available connected load. Another disadvantage is the asymmetrical loading of the three-phase supply network.

In order to eliminate these disadvantages, more recently power sources have been developed, which are connected to all three phases of the network and contain a three-phase bridge rectifier, together with a subsequent thyristor inverter or transistor inverter. As against conventional transformers with thyristors, such power sources are naturally complicated and expensive.

SUMMARY OF THE INVENTION

It is therefore the object of the invention to provide at a comparatively low cost an alternating current power source which loads all three phases of the three-phase supply network symmetrically.

According to the invention, this object is achieved by a circuit for an AC power source for welding, in particular for TIG (tungsten inert gas) and electrode welding, which generates an alternating current from a three-phase current and includes a three-phase transformer, 6 electronic switches, preferably thyristors and a throttle with center tapping. The three secondary windings of the transformer have center taps, which when switched together form a welding current connection. Three unidirectional windings starts lead to the cathodes of three thyristors, the anodes whereof are combined and lead to a winding start of the throttle. The three unidirectional winding ends lead to the anodes of three thyristors, the cathodes whereof are combined and lead to the other winding end of the throttle. The center tap of the throttle forms the second welding current connection. The thyristors are triggered sequentially so that the actuation of the thyristor at the start of the winding of the first transformer leg is followed by the actuation of the thyristor at the winding end of the second leg and subsequently by the actuation of the thyristor at the winding start of the third leg, followed by the actuation of the thyristor at the winding end of the first leg, etc.. The thyristor act as welding current control elements by means of phase shift control and the phase angle is limited to max 120° in order to prevent internal power source short circuits between the phases. An alternating current is generated in this manner on the secondary side, and all three phases of the network are uniformly loaded on the primary side. Thus, the power source essentially consists of a three-phase transformer, an inductor and six expensive thyristors with a low off-state voltage for system frequency applications and with a circuit for their sequential triggering.

BRIEF DESCRIPTION OF THE DRAWINGS

The invention is illustrated in the drawing and is described in more detail hereinbelow.

DETAILED DESCRIPTION OF THE PREFERRED EMBODIMENT

Figure 1:
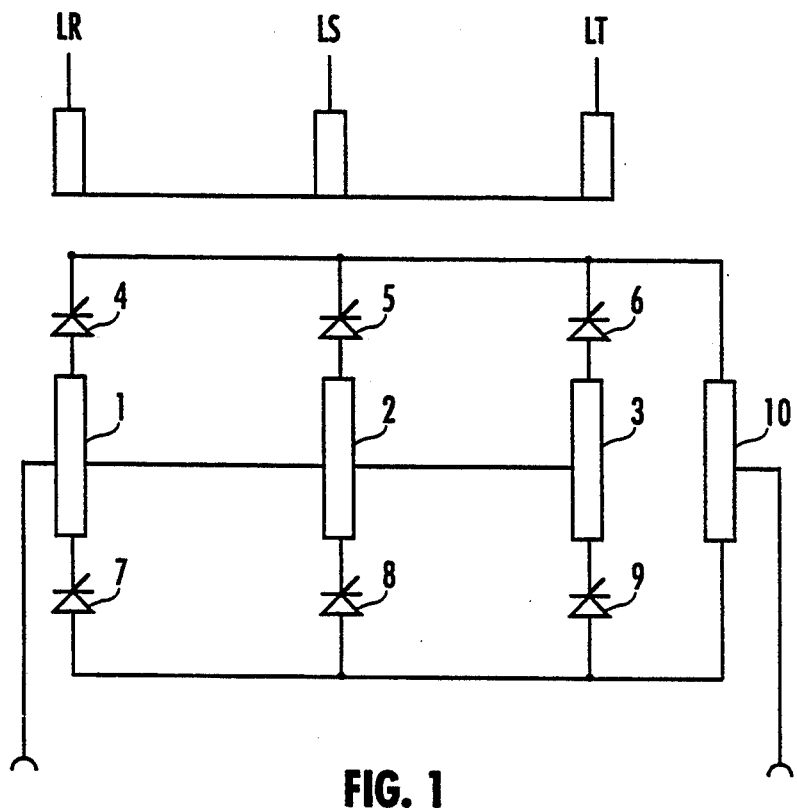
FIG. 1 shows the circuit diagram of the alternating current power source according to the invention.
Figure 2:
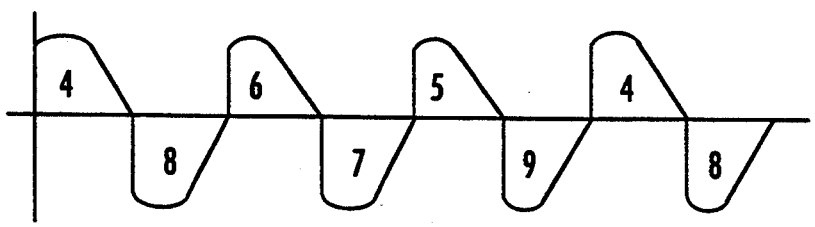
FIG. 2 shows the output waveform from the power source according to the invention.

For a better comprehension of the operation of the circuit layout, let us consider only the upper part of the transformer winding 1, 2, 3 on the secondary side and of the thyristors, 4, 5, 6 as well as the inductor 10. This circuit segment shows a Y-connection. The same is also true, if considered in itself, for the lower part of the circuit layout with the reversely poled thyristors 7, 8, 9. If in the Y-connection the phase angle is raised to a maximum of 120° only, always only one thyristor is conducting. If the thyristors 4,5 and 6 are sequentially triggered, a direct voltage with a pulse frequency of 150 Hz is generated on the output side. If, in the circuit layout according to the invention, the thyristors are triggered in the following sequence: 4 - 8 - 6 - 7 - 5 - 9 - 4 - 8 . . . , an alternating current voltage is generated at 75 Hz on the output side, the variation of which is shown in FIG. 2. The inductor 10 serves to smooth the welding current, since it passes through it in the same direction. The negative half-waves flow from the winding start, the positive half-waves from the winding end, to the center tap.

The advantage to be achieved by the invention thus consists of creating by means of the circuit concept and the sequence an alternating current power source which is very simple in its configuration and, as it uses only six thyristors and simple structural parts, inexpensive and which loads the three-phase supply network symmetrically and reduces the on-phase.

I claim:

1. An AC power source for welding, of the type configured to receive three phase power and to provide single phase current to a load having first and second terminals, comprising:
   a three-phase transformer having first, second and third center tapped secondary windings wherein each of said secondary winding has a first end, a second end, and a center tap;
   a center tap output indicator having a first end and a second end and a center tap; and
   first and second electronic switches in electrically operative association with said inductor and each of said secondary windings, said electronic switches disposed to conduct current selectively through said secondary windings and in the same flux-creating direction through said inductor regardless of the direction of current through the load.

2. The power source of claim 1, wherein said secondary windings are connected in a star configuration and said center tap of each of said secondary windings is in electrically operative association with the first load terminal.

3. The power source of claim 2, wherein said inductor is a center tapped inductor, and said center tap of said inductor is disposed in electrically operative association with the second load terminal.

4. The power source of claim 3, wherein each of said first and second switches is a thyristor.

5. The power source of claim 4, further comprising phase control means for sequentially rendering said thyristors conductive in a sequence which establishes current flow in said secondary windings in alternating flux-creating directions, whereby current flows in said first secondary winding prior to current flowing in said second secondary winding, current flows in said second secondary winding prior to current flowing in said third secondary winding, and current flows in said third secondary winding prior to current flowing in said first secondary winding.

6. The power source of claim 5, wherein said phase control means includes means for controlling the conduction period of each thyristor wherein each conduction period is equal to one-quarter of the period of said three phase power.

7. The power source of claim 5, wherein said phase control means includes means for controlling the length of time current flows though each of said secondary windings, wherein current flows through each of said secondary windings for an equal length of time.

8. The power source of claim 1, wherein each of said first electronic switches is connected between said first end of each of said secondary windings and said first end of said center tap inductor, and further wherein each of said second electronic switches is connected between said second end of each of said secondary windings and said second end of said second tap inductor.

* * * * *

UNITED STATES PATENT AND TRADEMARK OFFICE
CERTIFICATE OF CORRECTION

PATENT NO : 5,340,963
DATED : August 23, 1994
INVENTOR(S): Bodewigs

It is certified that error appears in the above-identified patent and that said Letters Patent is hereby corrected as shown below:

In claim 1, col. 2, line 62, replace "indicator" with --inductor--.

In claim 8, col. 4, line 20, replace "second tap" with --center tap--.

Signed and Sealed this

Thirtieth Day of March, 1999

Attest:

Q. TODD DICKINSON

*Attesting Officer*

*Acting Commissioner of Patents and Trademarks*